(12) United States Patent
Provenzale et al.

(10) Patent No.: US 8,503,441 B2
(45) Date of Patent: Aug. 6, 2013

(54) METHOD OF MANAGING A CALL ADDRESSED TO A TERMINAL ASSOCIATED TO AN ACCESS DEVICE

(75) Inventors: Fabrizio Provenzale, Turin (IT); Paolo Scalambro, Turin (IT); Marcello Sampo', Turin (IT)

(73) Assignee: Telecom Italia S.p.A., Milan (IT)

( * ) Notice: Subject to any disclaimer, the term of this patent is extended or adjusted under 35 U.S.C. 154(b) by 298 days.

(21) Appl. No.: 12/227,832

(22) PCT Filed: May 30, 2006

(86) PCT No.: PCT/EP2006/062727
§ 371 (c)(1),
(2), (4) Date: Mar. 4, 2009

(87) PCT Pub. No.: WO2007/137622
PCT Pub. Date: Dec. 6, 2007

(65) Prior Publication Data
US 2009/0185554 A1    Jul. 23, 2009

(51) Int. Cl.
*H04L 12/66* (2006.01)
*H04W 4/00* (2009.01)
*H04W 40/00* (2009.01)

(52) U.S. Cl.
USPC ............ 370/389; 370/338; 370/352; 455/445

(58) Field of Classification Search
USPC ................. 370/328–389, 401–431, 235–310; 455/426–433, 435–445; 709/226–241
See application file for complete search history.

(56) References Cited

U.S. PATENT DOCUMENTS

| | | | |
|---|---|---|---|
| 5,963,864 A | 10/1999 | O'Neil et al. | |
| 6,463,054 B1 * | 10/2002 | Mazur et al. | 370/352 |
| 6,693,886 B1 * | 2/2004 | Haikonen et al. | 370/338 |
| 7,161,914 B2 * | 1/2007 | Shoaib et al. | 370/331 |
| 7,162,270 B2 * | 1/2007 | Chen | 455/557 |

(Continued)

FOREIGN PATENT DOCUMENTS

| | | |
|---|---|---|
| EP | 1 006 741 B1 | 4/2003 |
| EP | 1 635 596 A1 | 3/2006 |

OTHER PUBLICATIONS

Gazis, et al., "On the Complexity of "Always Best Connected" in 4G Mobile Networks", Vehicular Technology Conference, 2003 IEEE, pp. 2312-2316, (Oct. 6, 2003).

*Primary Examiner* — M. Phan
(74) *Attorney, Agent, or Firm* — Finnegan, Henderson, Farabow, Garrett & Dunner, L.L.P.

(57) ABSTRACT

A method of managing a call addressed to a first terminal operating in a telephone system, which includes a mobile network, a packet-switched network and an access device allowing connection of dual mode terminals to the packet-switched network, wherein the method includes: a) providing configuration information by associating information related to a set of terminals to an identifier of the access device, the set of terminals including a dual mode terminal, which is adapted to operate in the mobile network and in the packet-switched network; b) providing status information related to the at least one dual mode terminal; c) upon reception of a request for the call, checking whether the first terminal belongs to the set of terminals; d) in the affirmative, routing the call to at least one selected terminal of the set of terminals, the selection being performed based on the configuration information and the status information; and d) in the negative, routing the call to the first terminal.

19 Claims, 8 Drawing Sheets

(56) References Cited

U.S. PATENT DOCUMENTS

| | | | |
|---|---|---|---|
| 7,436,843 B2 * | 10/2008 | Gustafsson et al. | 370/401 |
| 7,620,391 B2 * | 11/2009 | Itzkovitz et al. | 455/416 |
| 7,933,394 B2 * | 4/2011 | Holt et al. | 379/201.02 |
| 7,937,085 B2 * | 5/2011 | Rydnell et al. | 455/437 |
| 7,978,667 B2 * | 7/2011 | Kalhan | 370/338 |
| 2002/0077098 A1 | 6/2002 | Tiliks et al. | |
| 2005/0075109 A1 * | 4/2005 | Neyret et al. | 455/445 |
| 2006/0019667 A1 * | 1/2006 | Hicks | 455/445 |
| 2006/0050720 A1 * | 3/2006 | Zaitsu | 370/401 |
| 2006/0268902 A1 * | 11/2006 | Bonner | 370/401 |
| 2007/0070976 A1 * | 3/2007 | Mussman et al. | 370/351 |
| 2007/0217349 A1 * | 9/2007 | Fodor et al. | 370/310.2 |
| 2009/0017802 A1 * | 1/2009 | Zhang et al. | 455/414.1 |
| 2009/0052399 A1 * | 2/2009 | Silver et al. | 370/331 |
| 2009/0129274 A1 * | 5/2009 | Guillouard et al. | 370/235 |
| 2009/0305688 A1 * | 12/2009 | Bonnet et al. | 455/422.1 |
| 2010/0014470 A1 * | 1/2010 | Prytz et al. | 370/329 |

* cited by examiner

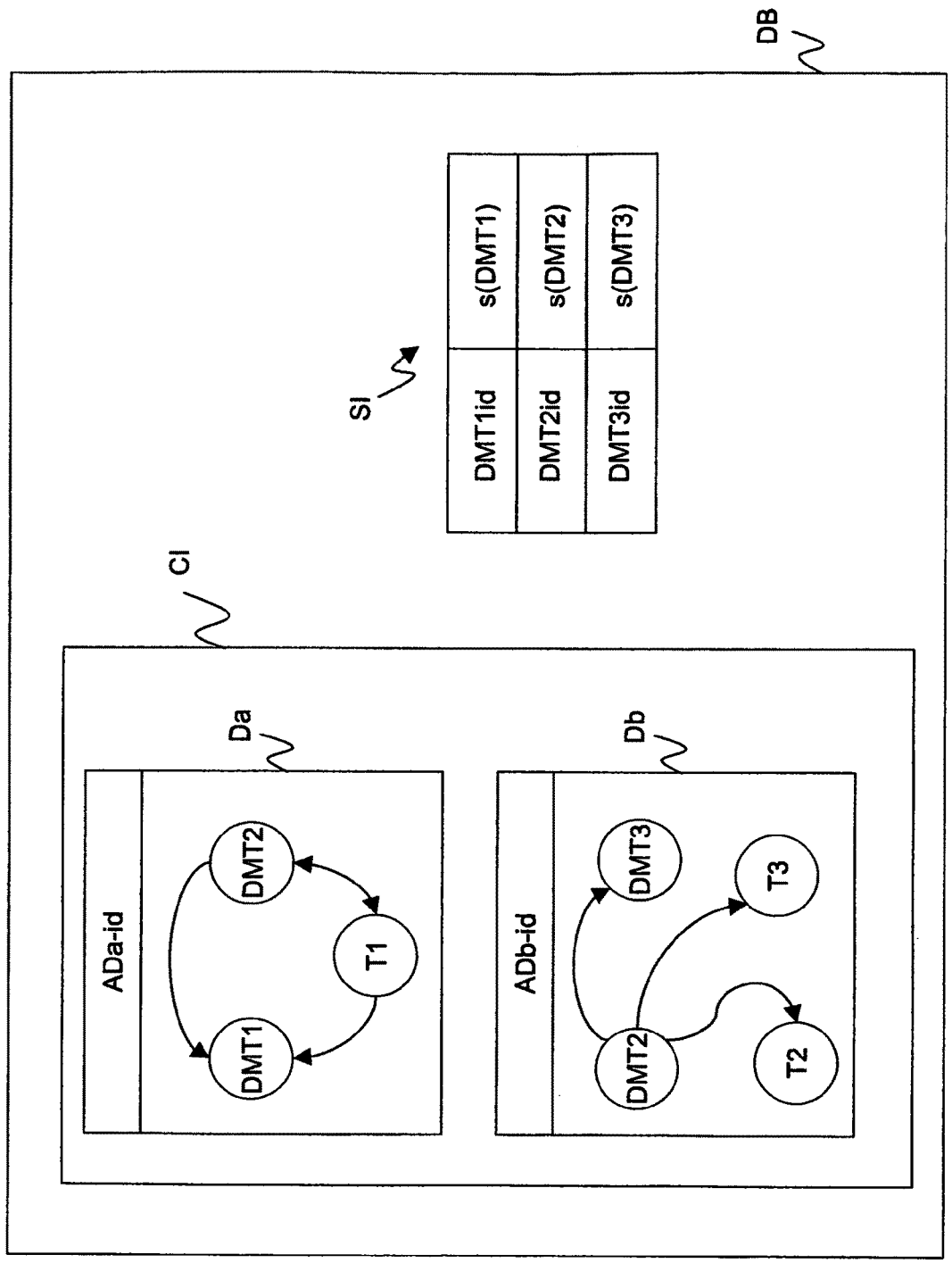

METHOD OF MANAGING A CALL ADDRESSED TO A TERMINAL ASSOCIATED TO AN ACCESS DEVICE

CROSS REFERENCE TO RELATED APPLICATION

This application is a national phase application based on PCT/EP2006/062727, filed May 30, 2006.

TECHNICAL FIELD

The present invention generally relates to the field of telephone services. More particularly, the present invention relates to a method of managing a call addressed to a terminal associated to an access device. The present invention further relates to a subsystem carrying out the method.

BACKGROUND ART

As known in the art, telephone services may be supported by circuit-switched telephone networks, either fixed or mobile, and by packet-switched telephone networks.

More particularly, mobile telephone networks, such as for instance GSM ("Global System for Mobile communications") and UMTS ("Universal Mobile Telecommunication System"), allow users to access telephone services through mobile terminals. A mobile telephone network is typically split in geographical areas which are termed "cells". Mobile terminals moving across a mobile telephone network may pass from cell to cell without undergoing service interruption.

On the other hand, packet-switched telephone networks are capable of supporting telephone services thanks to special protocols such as Voice over IP (briefly, VoIP), which is adapted to support real time transport of voice traffic through packets in an IP network. For accessing telephone services offered by a packet-switched network, a user is typically connected to the packet-switched network by means of an access network. An access network typically comprises a wired tree-like network (for instance ADSL, Optical Access Networks (OAN), or the like), each user-side termination of the tree being provided with an access device. Each access device may be connected to user terminals either through a wired connection or a wireless connection.

In case of wireless connection, the access device substantially comprises a bi-directional radio transceiver. For instance, in the wireless technology called Wi-Fi (Wireless Fidelity), such access devices are called "hotspots". User terminals are connected to an access device (and then to the packet-switched network) when they are located within the coverage area of the access device and when they are registered on the access device. Communication between the wireless access device and terminals is performed by using unlicensed frequencies. Access devices may be located in home environment, in office environment, or in public environment (railway stations, airport lounges, restaurants, or the like).

In the following description and in the claims, the expression "access device" will indicate a wireless access device for communicating with a given terminal through unlicensed frequencies, such as those used in the above mentioned Wi-Fi, Bluetooth or the like. The above cited "hotspots" are examples of said access devices. The expression "access network" will indicate a portion of a packet-switched network comprising one or more access devices.

In the art, dual mode terminals are known. A dual mode terminal is capable of being used either as a mobile terminal of a mobile telephone network, or as a wireless terminal of an access network connected to a packet-switched network external to the mobile telephone network. In the following description, the expression "cellular mode" will indicate a first mode of a dual mode terminal, wherein the dual mode terminal is employed as a mobile terminal of a mobile telephone network. On the other hand, the expression "wireless mode" will indicate a second mode of a dual mode terminal, wherein the dual mode terminal is employed as a wireless terminal of an access network connected to a packet-switched network.

In case a dual mode terminal is located within a coverage area of an access device, and the coverage area is within a cell of a mobile telephone network, the dual mode terminal is capable of working either in its wireless mode or in its cellular mode. Mode can be selected manually by the user, or it can be automatically selected by the dual mode terminal itself, according to various criteria (connection cost, or the like). When the dual mode terminal exits the coverage area of the access device, it can work only in cellular mode.

Operators of mobile circuit-switched telephone networks have developed technologies such as the Unlicensed Mobile Access (briefly, UMA), which allow an operator of a mobile telephone network to deal packet-switched networks and access networks as "extensions" of their mobile telephone network. In this way, a user provided with a dual mode terminal can access telephone services offered by the mobile telephone network even in wireless mode.

Among the various telephone services, a known telephone service allows a user to forward calls addressed to a given terminal also to terminals other than the originally called terminal.

U.S. Pat. No. 5,963,864 describes a method for providing telecommunication extension service to a subscriber with at least a first unit having a first number and a second unit having a second number. Upon receipt of a communication directed to the number associated with the one of the units, ringing is provided to both units. A party may answer either unit, or both units may be answered. If one unit is answered, then the other unit is provided with ringing for a predetermined number of rings or for a pre-selected amount of time.

US patent application 2002/0077098 A1 describes a method for dual ringing of a Centrex line and a wireless extension of the Centrex line. With dual ringing functionality, a single destination number dialed by a calling party results in ringing of both a Centrex line and a wireless extension of the Centrex line. In one preferred embodiment described therein, the dual ringing functionality is implemented with a network element (e.g., a service node) separate from a switch (e.g., a service signal point).

US patent application 2006/0019667 describes a method for providing integrated wireless and wired data voice and data services via a dual mode telecommunications device. A communication directed to an address associated with a dual mode device is received. If the dual mode device is in range of a wireless access point connected to a wired data network, then a determination is made whether the address of the dual mode device is associated with an address of at least one other device associated with the wired data network. If the address of the dual mode device is associated with an address of at least one other device associated with the wired data network, then the communication is routed over the wired data network to the dual mode device and the at least one other device.

SUMMARY OF THE INVENTION

In the present description, "user traceability" will designate the capability to reach a user by phone. Therefore, when user traceability is increased, the user can be found more easily.

In the following description and in the claims, the expression "a call addressed to a terminal" will designate a call addressed to a given directory number of a terminal, which can be either a fixed terminal or a dual mode terminal or a cellular terminal.

The Applicant has tackled the problem of managing a call addressed to a terminal of a telephone network with access devices in order to increase user traceability, in particular by exploiting dual mode terminal versatility.

According to a first aspect, the present invention provides a method of managing a call addressed to a first terminal operating in a telephone system, the telephone system comprising a mobile network, a packet-switched network and an access device allowing connection of dual mode terminals to said packet-switched network, wherein said method comprises:
  a) providing configuration information by associating information related to a set of terminals to an identifier of the access device, said set of terminals comprising a dual mode terminal, which is adapted to operate in said mobile network and in said packet-switched network;
  b) providing status information related to the dual mode terminal;
  c) upon reception of a request for said call, checking whether the first terminal belongs to said set of terminals;
  d) in the affirmative, routing the call to at least one selected terminal of the set of terminals, the selection being performed based on said configuration information and said status information; and
  e) in the negative, routing the call to the first terminal.

When the first terminal is said dual mode terminal of the set of terminals, the step d) may comprise:
  d1) checking whether the first terminal is connected to the packet-switched network through the access device;
  d2) in the negative, routing the call to the first terminal.

When the first terminal is said dual mode terminal of the set of terminals, the step d) may comprise:
  d1) checking whether the first terminal is connected to the packet-switched network through the access device;
  d3) in the affirmative,
    d31) checking whether said set of terminals comprises a further dual mode terminal;
    d32) in the affirmative, checking whether the further dual mode terminal is connected to the packet-switched network through the access device;
      d321) in the affirmative, routing the call to the first terminal and to the further dual mode terminal;
      d322) in the negative, routing the call to the first terminal and not to the further dual mode terminal.

When the first terminal is said dual mode terminal of the set of terminals, the step d) may comprise:
  d1) checking whether the first terminal is connected to the packet-switched network through the access device;
  d4) in the affirmative, checking whether said set of terminals comprises at least one fixed terminal;
  d5) in the affirmative, routing the call to the first terminal and to the at least one fixed terminal.

When the first terminal comprises a fixed terminal, the step d) may comprise:
  d1) checking whether the dual mode terminal of the set of terminals is connected to the packet-switched network through the access device;
  d2) in the negative, routing the call to the first terminal and not to the dual mode terminal of the set of terminals.

When the first terminal comprises a fixed terminal, the step d) may comprise:
  d1) checking whether the dual mode terminal of the set of terminals is connected to the packet-switched network through the access device;
  d3) in the affirmative, routing the call to the first terminal and to the dual mode terminal of the set of terminals.

Profitably, when the call is answered by a terminal, any further call routed to other terminals is released.

According to a second aspect, the present invention provides a telephone network subsystem for managing a call addressed to a first terminal operating in a telephone system, the telephone system comprising a mobile network, a packet-switched network and an access device allowing connection of dual mode terminals to said packet-switched network, wherein said subsystem comprises:
  a database for storing configuration information and status information, wherein such configuration information is obtained by associating information related to a set of terminals to an identifier of the access device, said set of terminals comprising a dual mode terminal, which is adapted to operate in said mobile network and in said packet-switched, and wherein said status information relates to the dual mode terminal;
  a server having a service logic which is adapted for, upon reception of a request for said call, checking whether the first terminal belongs to said set of terminals; and
    in the affirmative, it is adapted for commanding routing of the call to at least one selected terminal of the set of terminals, the selection being performed based on said configuration information and said status information; or
    in the negative, it is adapted for commanding routing of the call to the first terminal.

The first terminal may be said dual mode terminal of the set of terminals. In this case, the service logic may be adapted for checking whether the first terminal is connected to the packet-switched network through the access device, and, if the check is negative, it may be adapted for commanding routing of the call to the first terminal.

The first terminal may be said dual mode terminal of the set of terminals. In this case, the service logic:
  d1) may be adapted for checking whether the first terminal is connected to the packet-switched network through the access device;
  d3) in the affirmative,
    d31) it may be adapted for checking whether said set of terminals comprises a further dual mode terminal;
    d32) in the affirmative, it may be adapted for checking whether the further dual mode terminal is connected to the packet-switched network through the access device;
      d321) in the affirmative, it may be adapted for commanding routing of the call to the first terminal and to the further dual mode terminal;
      d322) in the negative, it may be adapted for commanding routing of the call to the first terminal and not to the further dual mode terminal.

The first terminal may be said dual mode terminal of the set of terminals. In this case, said service logic:
  d1) may be adapted for checking whether the first terminal is connected to the packet-switched network through the access device;
  d4) in the affirmative, it may be adapted for checking whether said set of terminals comprises at least one fixed terminal;
  d5) in the affirmative, it may be adapted for commanding routing the call to the first terminal and to the at least one fixed terminal.

The first terminal may comprise a fixed terminal. In this case, said service logic:

d1) may be adapted for checking whether the dual mode terminal of the set of terminals is connected to the packet-switched network through the access device;

d2) in the negative, it may be adapted for commanding routing the call to the first terminal and not to the dual mode terminal of the set of terminals.

The first terminal may comprise a fixed terminal. In this case, the service logic:

d1) may be adapted for checking whether the dual mode terminal of the set of terminals is connected to the packet-switched network through the access device;

d3) in the affirmative, it may be adapted for commanding routing the call to the first terminal and to the dual mode terminal of the set of terminals.

Preferably, when the call is answered by a terminal, any further calls routed to other terminals are released.

According to a third aspect, the present invention provides a computer program product, loadable in the memory of at least one computer and including software code portions for performing the above method.

BRIEF DESCRIPTION OF THE DRAWINGS

The present invention will be better understood by reading the following description, given by way of example and not of limitation, to be read with reference to the accompanying drawings, wherein:

FIG. 3 schematically shows a database comprising configuration information and status information;

DETAILED DESCRIPTION OF PREFERRED EMBODIMENTS OF THE INVENTION

Figure 1:
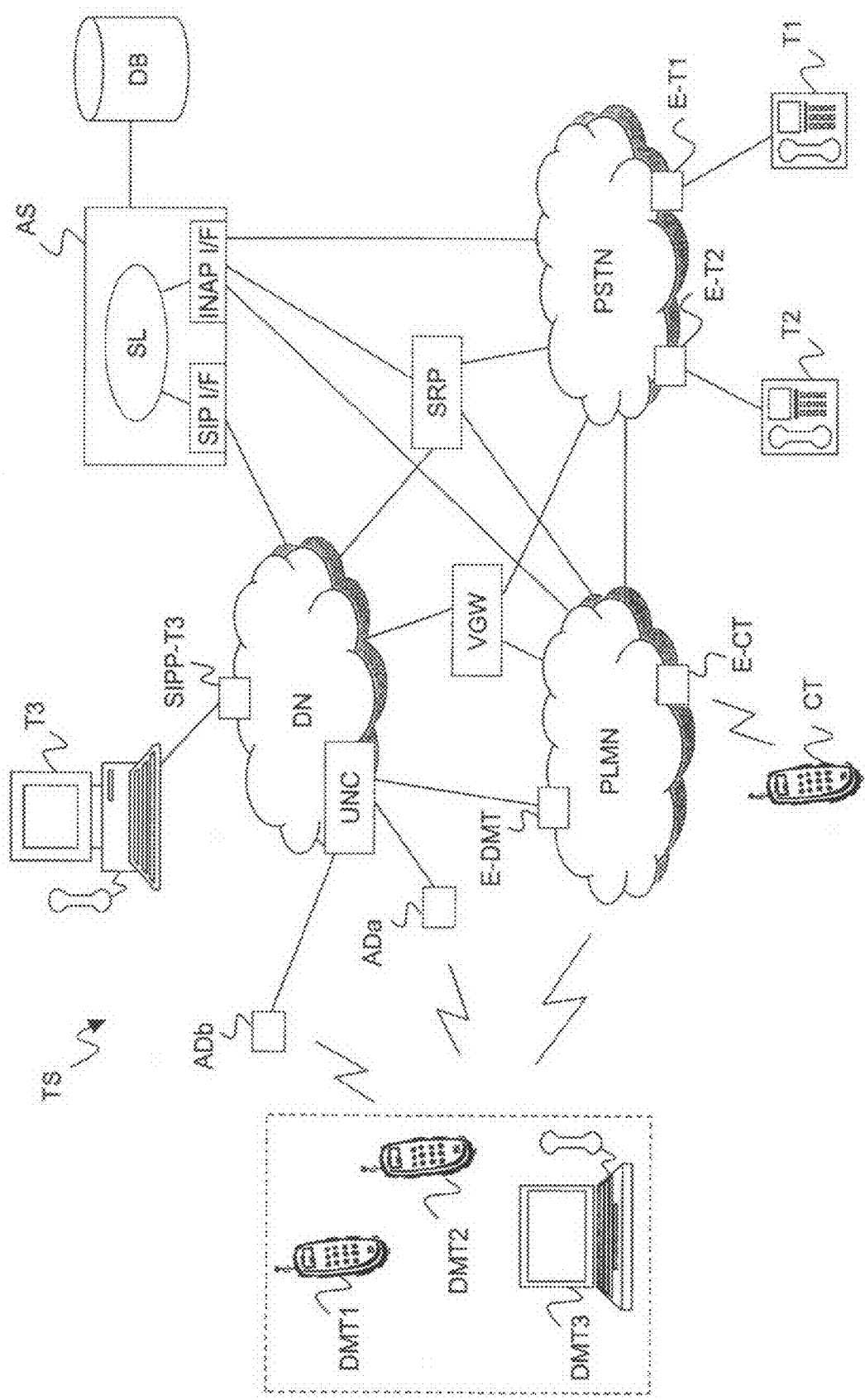
FIG. 1 schematically shows a telephone system with access devices for implementing the method of managing a call addressed to a terminal, according to an embodiment of the present invention.

FIG. 1 schematically shows a telephone system TS which is adapted to implement the method for managing a call addressed to a terminal associated to an access device, according to an embodiment of the present invention. The telephone system TS comprises a packet-switched network DN and a mobile telephone network PLMN. Conveniently, the telephone system TS further comprises a fixed telephone network PSTN.

The packet-switched network DN is adapted to support telephone services, for instance, but not exclusively, through VoIP. It is assumed that signaling relative to telephone services in the packet-switched network DN is based on SIP protocol. This is a non limiting example and other signaling protocols may be employed. A plurality of terminals are connected to the packet-switched network DN. For clarity reasons, FIG. 1 only shows a terminal T3, which is for instance a desktop computer provided with a VoIP handset. This is a non limiting example, since T3 could also be an IP Phone or any other terminal supporting voice sessions over IP protocol. The terminal T3 is connected to the packet-switched network DN through a SIP proxy server SIPP-T3, by means of which the terminal T3 sends/receives VoIP session requests.

A number of access devices are connected to the packet-switched network DN through access network portions, which are not shown for simplicity in FIG. 1. For clarity reasons, FIG. 1 only shows two access devices ADa, ADb. It is assumed that such access devices are wireless access devices. As already mentioned, wireless access devices allow wireless and dual mode terminals located within their coverage area to access both data services and telephone services offered by the network DN. For instance, such wireless access devices may be UMA-WiFi based. This is a non limiting example, and other wireless access technologies could be employed as well. Further, the packet-switched network DN may comprise a UMA network controller UNC, which is connected to access devices ADa, ADb. The UMA network controller UNC is responsible for interfacing the packet-switched network DN and the mobile telephone network PLMN according to UMA provisions.

The mobile telephone network PLMN may be for instance a GSM network, a UMTS network or the like. A number of terminals are connected to the mobile telephone network PLMN. For clarity reasons, FIG. 1 only shows a single terminal CT, which is connected to the network PLMN through an exchange E-CT (which basically is a mobile switching center MSC). Further, the network PLMN comprises a further exchange E-DMT, which is connected to the UMA network controller UNC.

As already mentioned, dual mode terminals may be connected either to the network PLMN, when in cellular mode, or to the network DN, when in wireless mode. For instance, FIG. 1 shows three dual mode terminals DMT1, DMT2, DMT3, which may be for instance two dual mode telephones DMT1, DMT2 and a laptop computer DMT3 provided with both a wireless card (e.g. a Wi-Fi card) and a mobile card (e.g. a SIM card) for switching between cellular mode and wireless mode, and a handset for supporting telephone services. Such dual mode terminals may be connected either to the network PLMN or to the network DN through the access devices ADa, ADb.

A number of terminals are connected to the circuit-switched fixed telephone network PSTN. For clarity reasons, FIG. 1 only shows two terminals T1, T2, which are substantially two fixed telephones, each being connected to the network PSTN through a respective exchange E-T1, E-T2.

The telephone system TS further comprises at least a voice gateway VGW, which interfaces signaling protocol of the networks PLMN and PSTN (which may be for instance the ISUP protocol), and the signaling protocol of the packet-switched network DN (which may be, as already mentioned, the SIP protocol). Further, the voice gateway VGW converts voice traffic coming from networks PLMN and PSTN and addresses it to network DN in a packet flow, and vice versa.

The telephone system of FIG. 1 further comprises some Intelligent Network devices. As known, an Intelligent Network allows to create, modify and upgrade telephone services in a circuit-switched telephone network (for instance networks PLMN and PSTN of FIG. 1) substantially without modifying hardware and software of exchanges. Indeed, Intelligent Network allows to centralize service management functions in dedicated Intelligent Network devices, which can be either physically separated by exchanges or integrated in exchanges. Intelligent Network devices may communicate with each other by means of INAP protocol. FIG. 1 only shows two Intelligent Network devices: an application server AS and a service resource point SRP. Other Intelligent Network Devices will not be described, since they are not relevant to the present description.

In particular, the application server AS is a device which can be separated from networks PLMN, DN and PSTN, and which comprises a software logic SL for executing the method of managing a call received by an originally called dual mode terminal according to embodiments of the invention. The application server AS further comprises an INAP interface INAP/IF for communicating, through INAP protocol, with the SRP and with other Intelligent Network devices (not shown in FIG. 1) located in networks PLMN and PSTN, such as Service Switching Points (SSP). In the following, it is assumed that the exchanges of the networks PSTN and PLMN (E-CT, E-DMT, E-T1, E-T2) comprise such SSP function, although not shown in FIG. 1. Further, the application server AS comprises a SIP interface SIP/IF for communicating, through SIP protocol, with SIP proxy servers of the network DN. Further, the application server AS is associated to a database DB, which comprises information for implementing the method of the invention, as it will be shown in further detail here in after.

The service resource point SRP interacts with the application server AS, with Intelligent Network devices (not shown in FIG. 1) located in networks PLMN and PSTN, and with SIP proxy servers of the network DN, such as the SIP proxy server SIPP-T3. Generally speaking, the service resource point SRP is adapted to provide user with special resources which may be required for implementing telephone services. Examples of such special resources may be predefined voice announcements, customized voice announcements, or the like. The role of the SRP will be explained in further detail herein after.

In the following, it is assumed that a user has a first dual mode terminal DMT1 (for instance, his personal dual mode telephone), a second dual mode terminal DMT2 (for instance, his business dual mode telephone), a third dual mode terminal DMT3 (for instance, his laptop computer), a first terminal T1 of the network PSTN (for instance, his home telephone), a second terminal T2 of the network PSTN (for instance, his office telephone), and a terminal T3 of the network DN (for instance, his desktop computer in his office). Moreover, the user has a first access device ADa (for instance, his home access device) allowing the user to access the network DN with any of his dual mode terminals DMT1, DMT2, DMT3 from his home, and a second access device ADb (for instance, his office access device) allowing the user to access the network DN with any of his dual mode terminals DMT1, DMT2, DMT3 from his office. It has to be noticed that each terminal T1, T2, T3, DMT1, DMT2, DMT3 typically has its own telephone number. The user may also have other terminals such as mobile terminals connected to the network PLMN.

Therefore, each dual mode terminal DMT1, DMT2, DMT3 may be either in cellular mode or in wireless mode. When in wireless mode, each dual mode terminal may be connected either to access devices ADa, ADb, or to any other access device of the packet-switched network DN (not shown in FIG. 1).

The present invention provides a method of managing a call addressed to either one of the terminals T1, T2, T3, DMT1, DMT2, DMT3 available to the user. The method will be now explained by referring to FIGS. 2a, 2b, 2c, which schematically show three examples of configuration information for performing the method of managing a call addressed to a terminal.

Figure 2C:
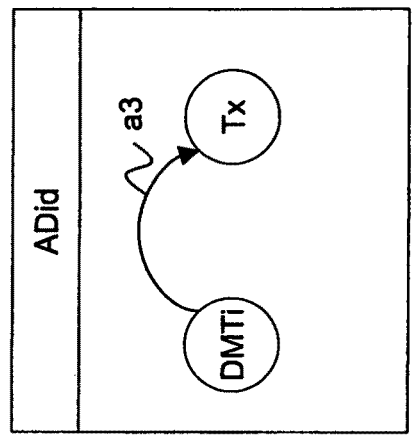
FIGS. 2a, 2b and 2c schematically show three examples of configuration information.
Figure 2B:
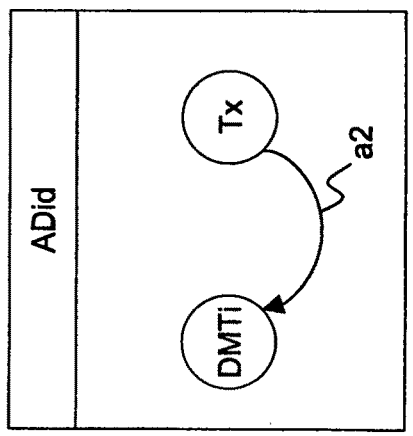
Figure 2A:
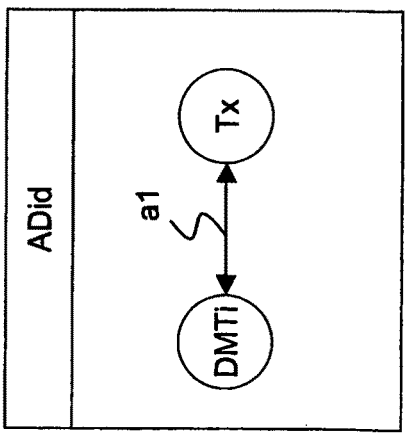

In particular, according to embodiments of the present invention, a configuration step is provided. During such a configuration step, a user associates to an access device identifier at least a dual mode terminal DMTi and a further terminal Tx, which can be either another dual mode terminal or a fixed terminal. Then, the user may establish relationships between terminals associated to a same access device identifier, i.e.: for each terminal associated to a given access device identifier, the user may establish whether calls addressed to such a terminal must be routed or not also to other terminals associated to the same access device identifier. For simplicity, FIGS. 2a, 2b, 2c show a simple case, wherein an access device identifier ADid has associated a single dual mode terminal DMTi and a single terminal Tx. In this simple case, only three options are provided.

For example, as shown in FIG. 2a, the user may establish that calls addressed to dual mode terminal DMTi are routed also to Tx, and calls addressed to Tx are routed also to dual mode terminal DMTi. In FIG. 2a, this relationship between DMTi and Tx is represented by a double arrow a1 between DMTi and Tx. In this case, the relationship between DMTi and Tx is symmetric.

Alternatively, as shown in FIG. 2b, the user may establish that calls addressed to dual mode terminal DMTi are routed only to DMTi, while calls addressed to Tx are routed also to dual mode terminal DMTi. In FIG. 2b, this relationship between dual mode terminal DMTi and Tx is represented by a single arrow a2 going from Tx to DMTi. In this case, the relationship between dual mode terminal DMTi and Tx is asymmetric.

Alternatively, as shown in FIG. 2c, the user may establish that calls addressed to dual mode terminal DMTi are routed also to Tx, while calls addressed to Tx are routed only to Tx. In FIG. 2c, this relationship between dual mode terminal DMTi and Tx is represented by a single arrow a3 going from DMTi to Tx. Also in this case, the relationship between dual mode terminal DMTi and Tx is asymmetric.

More particularly, according to the first and third options, calls addressed to dual mode terminal DMTi are routed also to Tx if:
  DMTi is connected to (namely, under the coverage of) the access device identified by ADid; and
  either Tx is a fixed terminal, or Tx is a dual mode terminal which is connected to (namely, under the coverage of) the access device identified by ADid.

Similarly, according to the second and third options, calls addressed to Tx are routed also to dual mode terminal DMTi if:
  either Tx is a fixed terminal, or Tx is a dual mode terminal which is connected to (namely, under the coverage of) the access device identified by ADid; and
  DMTi is connected to (namely, under the coverage of) the access device identified by ADid.

In the following description and in the claims, information relating to access device identifiers and terminals associated to access device identifiers will be termed "configuration information". The information relating to terminals may comprise identifiers of terminals (such as a telephone number or an address) and/or type of terminals (dual mode, fixed, mobile). In the following description and in the claims, information relating to the status of dual mode terminals associated to access device identifiers (i.e. whether such dual mode terminals are either in cellular mode or in wireless mode, and, in the latter case, the access device they are connected to) will be termed "status information".

While configuration information is a static information, i.e. it can be modified only by the user during the configuration step, status information is a dynamic information which is continuously updated by the telephone network according to the actual status and location of the dual mode terminals.

According to an embodiment of the present invention, configuration information and status information relating to a given user are stored in the database DB shown in FIG. 1, and they are used by the application server for implementing the method of the invention of managing a call addressed to a terminal, as it will be shown in greater detail herein after.

FIG. 3 schematically shows a logical representation of exemplary configuration information CI and exemplary status information SI stored into the database DB for implementing the method of managing a call addressed to a terminal, according to an embodiment of the present invention.

In FIG. 3, configuration information CI comprises, for each access device identifier, ADa-id, ADb-id, a separate diagram Da, Db.

In the diagram Da of FIG. 3, terminals DMT1, DMT2, T1 are associated to the access device identifier ADa-id. The arrows of Da (which, for simplicity, are without numeral reference) show symmetrical and asymmetrical relationships between associated terminals. In particular, such arrows indicate that:
    calls addressed to the associated terminal T1 are also routed to DMT1, DMT2 if DMT1, DMT2 are connected to ADa;
    calls addressed to associated terminal DMT2 are also routed to T1 and to DMT1, if the terminal DMT2 is connected to ADa and if also DMT1 is connected to ADa; and
    calls addressed to the associated terminal DMT1 are routed only to DMT1.

Similarly, in the diagram Db of FIG. 3, terminals DMT2, DMT3, T2, T3 are associated to the access device identifier ADb-id. The arrows of Db (which, for simplicity, are without numeral reference) show asymmetrical relationships between associated terminals. In particular, such arrows indicate that:
    calls addressed to DMT2 are also routed to T2, T3 and to DMT3, if the associated terminal DMT2 is connected to ADb and if also DMT3 is connected to ADb;
    calls addressed to DMT3 are routed only to DMT3;
    calls addressed to T2 are routed only to T2; and
    calls addressed to T3 are routed only to T3.

Therefore, in case of a call addressed to the dual mode terminal DMT2, the access devices ADa, ADb are identified, and it is checked whether the dual mode terminal DMT2 is connected either to ADa or to ADb. Then, in case DMT2 is connected to ADa, the call to DMT2 is maintained and it is also routed to T1. The call is also routed to DMT1, if DMT1 is connected to ADa. Similarly, in case DMT2 is connected to ADb, the call to DMT2 is maintained and it is also routed to T2 and T3. The call is also routed to DMT3 if DMT3 is connected to ADb.

Otherwise, is case DMT2 is neither connected to ADa nor to ADb (for instance DMT2 is in cellular mode, or it is in wireless mode but it is connected to an access device which is not associated to DMT2), only the call to the originally addressed terminal DMT2 is maintained.

FIG. 3 only shows two exemplary diagrams Da, Db, illustrating exemplary relationships (either symmetrical or asymmetrical) between terminals associated to a first and a second access device identifier ADa-id, ADb-id. Of course this is only exemplary. The user could provide other symmetrical or asymmetrical relationships between terminals associated to a same access device identifier.

The configuration information CI may be stored into the data base according to different data models. For instance, the data model can comprise a set of tables wherein access device identifiers are entry points of such tables. Further data models can be employed, such as tree diagrams or the like.

The database DB of FIG. 3 further comprises status information SI relating to dual mode terminals DMT1, DMT2, DMT3. By way of example, such status information SI is represented in FIG. 3 as a table. Each row of the table comprises an identifier DMT1id, DMT2id, DMT3id for each respective dual mode terminal DMT1, DMT2, DMT3. Further, each row comprises a respective status s(DMT1), s(DMT2), s(DMT3) for each respective dual mode terminal DMT1, DMT2, DMT3. Each status s(DMT1), s(DMT2), s(DMT3) indicates whether the respective dual mode terminal DMT1, DMT2, DMT3 is not connected (e.g. switched off), in cellular mode, in wireless mode, and, in the latter case, the access device it is connected to. Other statuses can be added according to the implementation of the database DB.

Therefore, advantageously, a user is able to configure the service in a very versatile way, for increasing his traceability. Indeed, a user is not only able to receive a call originally addressed to a given terminal associated to an access device, but also on other associated terminals, so that he can choose a preferred terminal for answering the call. He is also able to change such other associated terminals according to the status of his dual mode terminal. Indeed, thanks to configuration information CI and status information SI, according to the present invention, the service logic SL of the application server firstly detects the status of the originally addressed terminal, and then, according to such a detected status, performs the next steps of the method. In other words, calls addressed to a given terminal can be routed to different associated terminals.

Herein after, by referring to FIG. 4, the method of managing a call addressed to a fixed terminal associated to an access device according to an embodiment of the present invention will be described. It is assumed that the originally addressed terminal is the fixed terminal T1.

It will be assumed that the structure of the telephone system is the one shown in FIG. 1, while configuration information and status information stored into the database DB are those shown in FIG. 3.

The method starts (step 400) when a caller, through his own calling terminal CT, dials the telephone number of the fixed terminal T1 (step 401). In this example, the calling terminal CT is a mobile terminal of the mobile telephone network PLMN. This is only an example, since the caller could also make the call from a terminal of the network PSTN as well as from a terminal of the data network DN.

The telephone networks PSTN and PLMN route the call to the exchange E-T1, which is in charge of handling calls addressed to the fixed terminal T1. Then, the exchange E-T1 checks the service profile of the fixed terminal T1, and invokes the service logic SL on the application server AS (step 402). The application server AS performs some coherence checks (such as for instance checking whether the service is active for the originally called terminal, checking whether the user profile is a valid profile, or the like) and then it retrieves the configuration information CI relating to T1 (step 403) from the database DB. By using the configuration information CI, the application server AS determines the access device identifiers (i.e., in this example, ADa-id) the originally addressed fixed terminal T1 is associated to. Further, the application server AS determines dual mode and fixed terminals associated to the same access device identifier ADa-id which, in this example, are the dual mode terminal DMT1 and the dual mode terminal DMT2. Moreover, during step 404, the application server AS retrieves the status information SI loaded in the data base DB, relative to associated dual mode terminals DMT1, DMT2.

Then, the application server AS determines from the status information SI whether the other dual mode terminals associated to ADa-id (namely, the terminals DMT1, DMT2 in this example) are connected to the access device ADa (step 405). If at least one of the dual mode terminals which are associated to ADa (namely DMT1, in this case) is connected to the access device ADa, the application server AS can instruct the SRP to send a courtesy announcement (step 406) to the calling terminal CT, inviting the caller to hold the line while the call is routed. The application server AS then instructs the exchange E-T1 of the originally called fixed terminal to route the call towards the originally called fixed terminal T1 and towards the dual mode terminal DMT1 which is connected to ADa (step 407). Therefore, both terminals DMT1 and T1 will ring. They will ring until the user answers the call from any one of his terminals DMT1 and T1 (step 408). When the user answers the call (for instance from his dual mode terminal DMT1), the application server AS instructs the service resource point SRP to stop the courtesy announcement to the calling terminal CT (step 409) and instructs the exchange E-T1 to release the call towards T1 (step 410).

If, during the step 405, the application server AS detects that none of the terminals DMT1, DMT2 associated to ADa-id is connected to the access device ADa (for instance because they are in cellular mode or because they are in wireless mode but they are located under the coverage area of a different access device), the application server AS instructs the exchange E-T1 to route the call only to the originally called fixed terminal T1 (step 411), so that a normal call between CT and T1 is established (step 412).

Herein after, by referring to FIG. 5, the method of managing a call addressed to a dual mode terminal associated to an access device according to an embodiment of the present invention will be described. It is assumed that the originally addressed terminal is the dual mode terminal DMT2.

It will be assumed that the structure of the telephone system is the one shown in FIG. 1, while configuration information and status information stored into the database DB are those shown in FIG. 3.

The method starts (step 500) when a caller, through his own calling terminal CT, dials the telephone number of the dual mode terminal DMT2 (step 501). In this example, the calling terminal CT is a mobile terminal of the mobile telephone network PLMN. This is only an example, since the caller could also make the call from a terminal of the network PSTN as well as from a terminal of the data network DN.

The telephone network PLMN routes the call to the exchange E-DMT, which is in charge of handling calls addressed to the dual mode terminal DMT2. Then, the exchange E-DMT checks the service profile of the dual mode terminal DMT2, and invokes the service logic SL on the application server AS (step 502). The application server AS performs some coherence checks and then it retrieves the configuration information CI and the status information SI relating to DMT2 (step 503) from the database DB. By using the configuration information CI, the application server AS determines the access device identifiers (i.e., in this example, ADa-id and ADb-id) the originally addressed dual mode terminal DMT2 is associated to. Further, the application server AS determines other dual mode and fixed terminals associated to the access device identifiers ADa-id, ADb-id. In this example, the terminals associated to ADa-id are the fixed terminal T1 and the dual mode terminal DMT1; the terminals associated to ADb-id are the fixed terminals T2 and T3 and the dual mode terminal DMT3. Moreover, during step 503, the application server AS retrieves the status information SI stored in the data base DB. Such status information SI is used by the application server to verify whether the dual mode terminal DMT2 which was originally called is connected to one of the access devices ADa, ADb (step 504).

If the originally called terminal DMT2 is connected to one of its access devices (for instance ADa), the application server AS can instruct the SRP to send a courtesy announcement 505 to the calling terminal CT, inviting the caller to hold the line while the call is routed. Then, the application server AS determines from the status information SI whether also the other dual mode terminals associated to ADa-id (namely, the terminal DMT1 in this example) are connected to the access device ADa (step 506). If at least one of the dual mode terminals associated to ADa-id (namely only DMT1, in this case) is connected to ADa, the application server AS can instruct the exchange E-DMT of the originally called dual mode terminal to route the call towards the originally called dual mode terminal DMT2, towards the dual mode terminal DMT1 associated to ADa-id and connected to ADa, and towards the fixed terminal T1 associated to ADa-id (step 507). Therefore, all the three terminals DMT2, DMT1 and T1 will ring. They will ring until the user answers the call from any one of his terminals DMT2, DMT1 and T1 (step 508). When the user answers the call (for instance from his fixed telephone T1), the application server AS instructs the service resource point SRP to stop the courtesy announcement to the calling terminal CT (step 509) and instructs the exchange E-DMT to release the calls towards DMT2 and DMT1 (step 510).

If, during the step 506, the application server AS detects that the dual mode terminal DMT1 which is associated to ADa-id is not connected to ADa, it instructs the exchange E-DMT to route the call to the originally called dual mode terminal DMT2 and to the fixed terminal T1 which is associated to ADa-id (step 507'). Therefore, both the terminals DMT2 and T1 start ringing and they will continue to ring until the user answers the call from any one of the terminals DMT2 and T1 (step 508'). When the user answers the call (for instance through his terminal T1), the application server AS instructs the SRP to stop the transmission of the courtesy announcement towards the calling terminal CT (step 509') and it instructs the exchange E-DMT to release the call directed to the originally called dual mode terminal DMT2 (step 510').

If, during the step 504, the application server AS detects that the originally called terminal DMT2 is not connected to any of the access devices ADa, ADb (for instance because it is in cellular mode or because it is in wireless mode but it is located under the coverage area of an access device which is not associated thereto), the application server AS instructs the exchange E-DMT to route the call only to the originally called dual mode terminal DMT2 (step 511). In this case, therefore, a normal call between CT and DMT2 is established.

According to advantageous embodiments of the present invention, the user, after answering the call with a terminal, can decide to continue the telephone conversation with a terminal other than the one used for answering the call.

Figure 6:
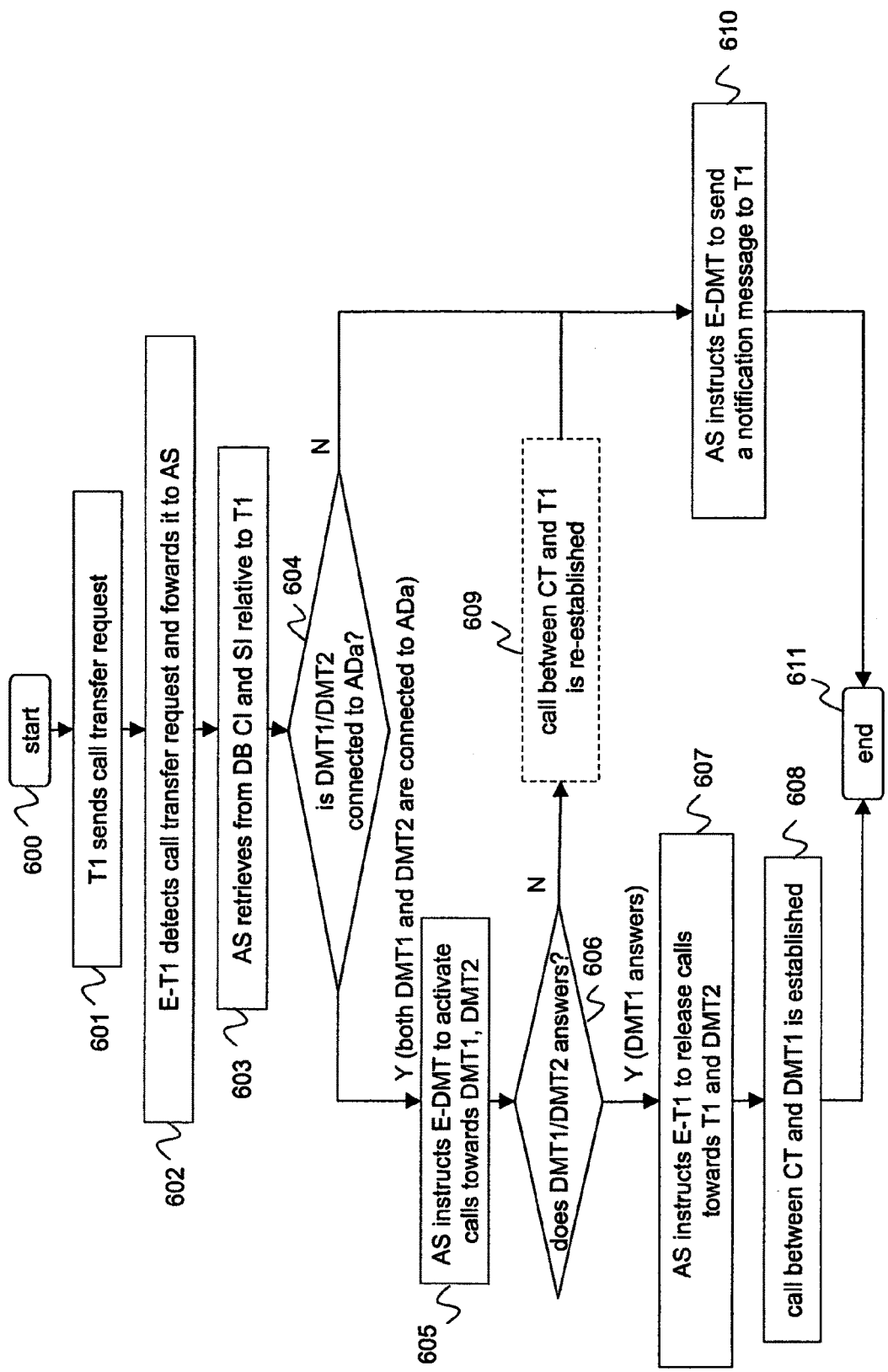
FIG. 6 shows a flow chart of a call transfer procedure from a fixed terminal to a dual mode terminal, according to an embodiment of the present invention.

FIG. 6 shows a flow chart of a call transfer procedure in case the user already answered the call with a fixed terminal and is willing to transfer it to a dual mode terminal.

In the description of FIG. 6, it will be assumed that the structure of the telephone system is the one shown in FIG. 1, while configuration information and status information stored into the database DB are those shown in FIG. 3.

Figure 5:
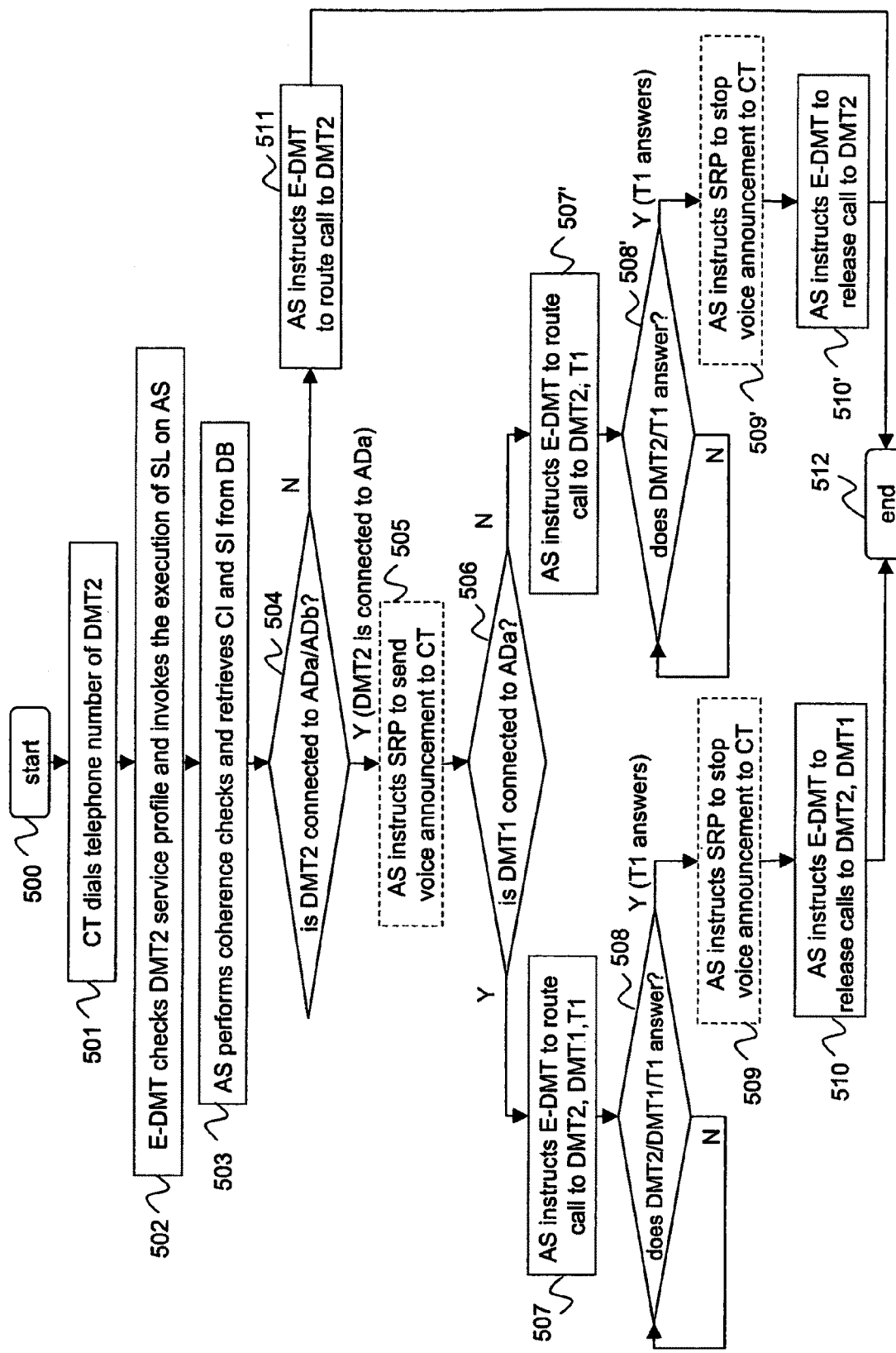
FIG. 5 shows a flow chart of the method of managing a call addressed to a dual mode terminal, according to an embodiment of the present invention.

It is assumed that, following a call management similar to that of FIG. 5, the user has answered the call with his fixed terminal T1.

The call transfer procedure starts (step 600) when the user sends to the application server AS, by his terminal T1 (which terminal will be termed, in the following description, "transferring terminal") a request for transferring a call (step 601). The procedure of sending such a call transfer request depends on the type of terminal. In the present case, the transferring terminal T1 is a fixed terminal which is connected with the network PSTN. Therefore, the call transfer request can be sent, for instance, by sending one or more DMTF digit (for instance "#"). If the transferring terminal were a fixed terminal connected to the data network DN (for instance a VoIP terminal), the call transfer request could be sent by a proper SIP protocol message, termed INFO.

The exchange E-DMT, which is in charge of handling the call originally addressed to DMT2 and answered by T1, receives the call transfer request and forwards it to the application server AS (step 602). The application server AS recovers the configuration information CI stored in the database DB which relates to the transferring terminal T1 and also recovers the status information SI stored in the data base DB (step 603). Using the configuration information CI, the application server AS determines the access device identifier to which the transferring terminal T1 is associated, namely ADa-id in this example. In addition, the application server AS determines dual mode terminals and other fixed terminals which are associated to the access device identifier ADa-id. In this example, two dual mode terminals DMT1 and DMT2 are associated to the access device identifier ADa-id. During step 603, the application server AS also retrieves the status information SI which is stored in the data base DB. Through such status information SI, the application server AS verifies whether the two dual mode terminals DMT1, DMT2 which are associated to ADa-id are connected to the access device ADa (step 604).

Then, the application server AS instructs the exchange E-DMT to activate a call towards the fixed terminals which are associated to ADa-id (indeed, in the present example, there are no other fixed terminals associated to ADa-id) and towards the dual mode terminals associated to ADa-id and connected to the access device ADa (step 605).

For instance, if both the dual mode terminals DMT1, DMT2 which are associated to ADa-id are connected to ADa, the application server AS instructs to activate calls towards DMT1 and DMT2. According to embodiments of the present invention, the step 605 can include a step of maintaining active the call between the calling terminal CT and the transferring terminal T1, while the calls towards the associated terminals DMT1 and DMT2 are set up. Optionally, the calls towards the terminals CT, DMT1, DMT2 can be connected by a conferencing bridge. According to further embodiments of the present invention, step 605 can include the step of temporarily releasing the call between the calling terminal CT and the transferring terminal T1 while the calls towards the associated terminals DMT1, DMT2 are set up. In this case, optionally, it is possible to send a courtesy announcement to the caller inviting him to hold the line while the call transfer is carried out.

Therefore, the two dual mode terminals DMT1, DMT2 start ringing and they continue to ring until one of the two terminals answers the call (step 606). Preferably, it is predetermined a maximum time within which the call has to be answered by the dual mode terminal DMT1 or by the dual mode terminal DMT2. Once such a maximum time has lapsed, the calls to DMT1 and DMT2 are released and, in case the call between the calling terminal CT and the transferring terminal T1 has been released during the step 605, the application server AS instructs the exchange E-DMT to reestablish the call between the calling terminal CT and the transferring terminal T1 (step 609). Then, the application server AS instructs the exchange E-DMT to send a notification message to the transferring terminal T1 in order to notify that the call transfer has not been carried out (step 610).

However, if the call is answered (for instance by terminal DMT1) within the maximum predetermined time, the application server AS instructs the exchange E-DMT to release the calls to the transferring terminal T1 and to the dual mode terminal DMT2 (step 607). A call between the calling terminal CT and the dual mode terminal DMT1 is therefore set up (step 608).

If, during the step 604, the application server detects that no other fixed terminal is associated to ADa-id and that the dual mode terminals DMT1 and DMT2 associated to the ADa-id are not connected to the access device ADa, the method continues at step 610, wherein the application server AS instructs the exchange E-DMT to send a notification message to the transferring terminal T1 in order to notify that the call transfer can not been carried out.

Figure 7:
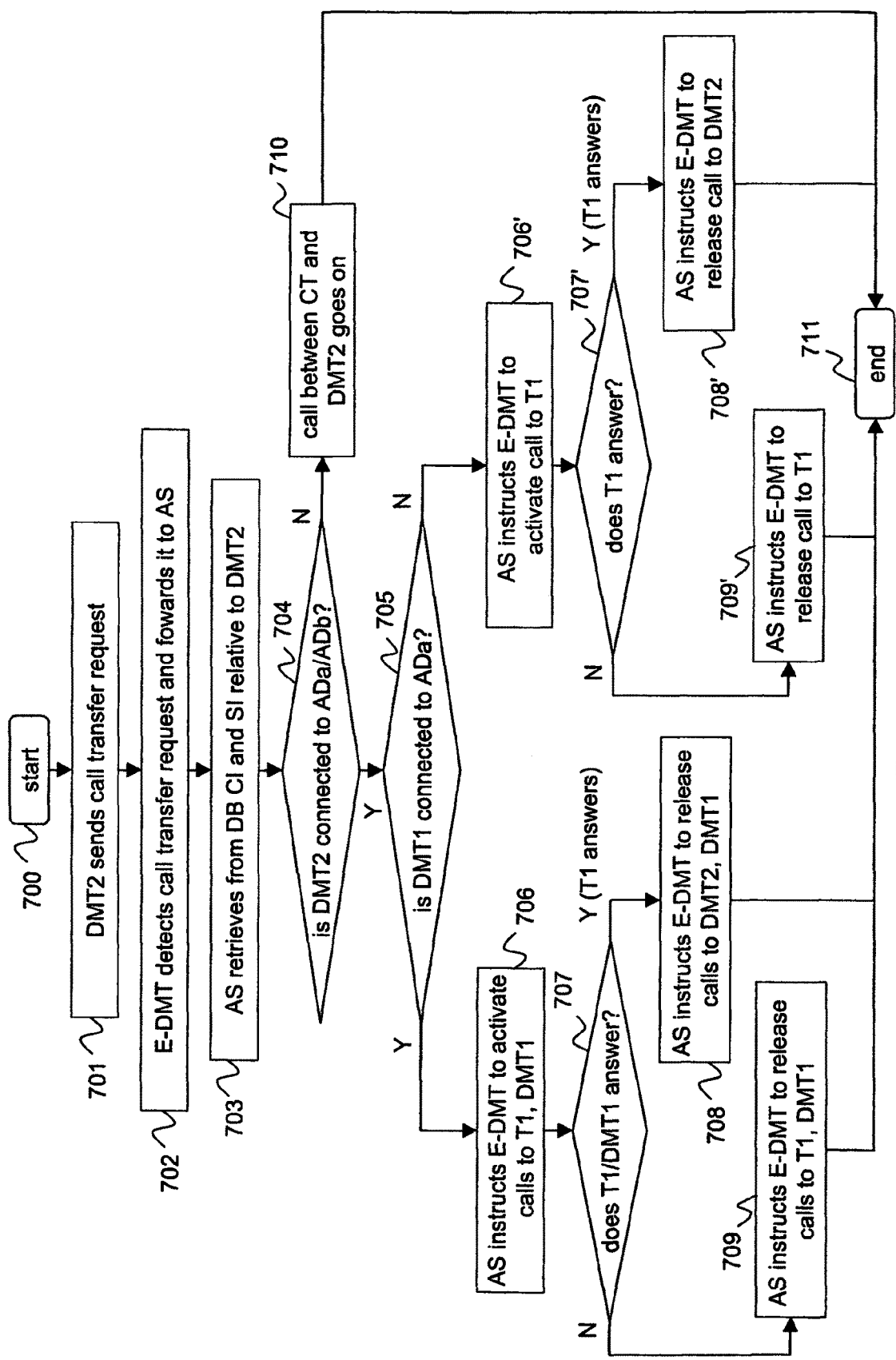
FIG. 7 shows a flow chart of a call transfer procedure from a dual mode terminal to a fixed terminal, according to an embodiment of the present invention.

FIG. 7 shows a block diagram of a call transfer procedure according to an embodiment of the present invention, in case the user has already answered the call from a dual mode terminal and is willing to transfer the call to a fixed terminal.

In the description of FIG. 7, it will be assumed that the structure of the telephone system is the one shown in FIG. 1, while configuration information and status information stored into the database DB are those shown in FIG. 3.

Figure 4:
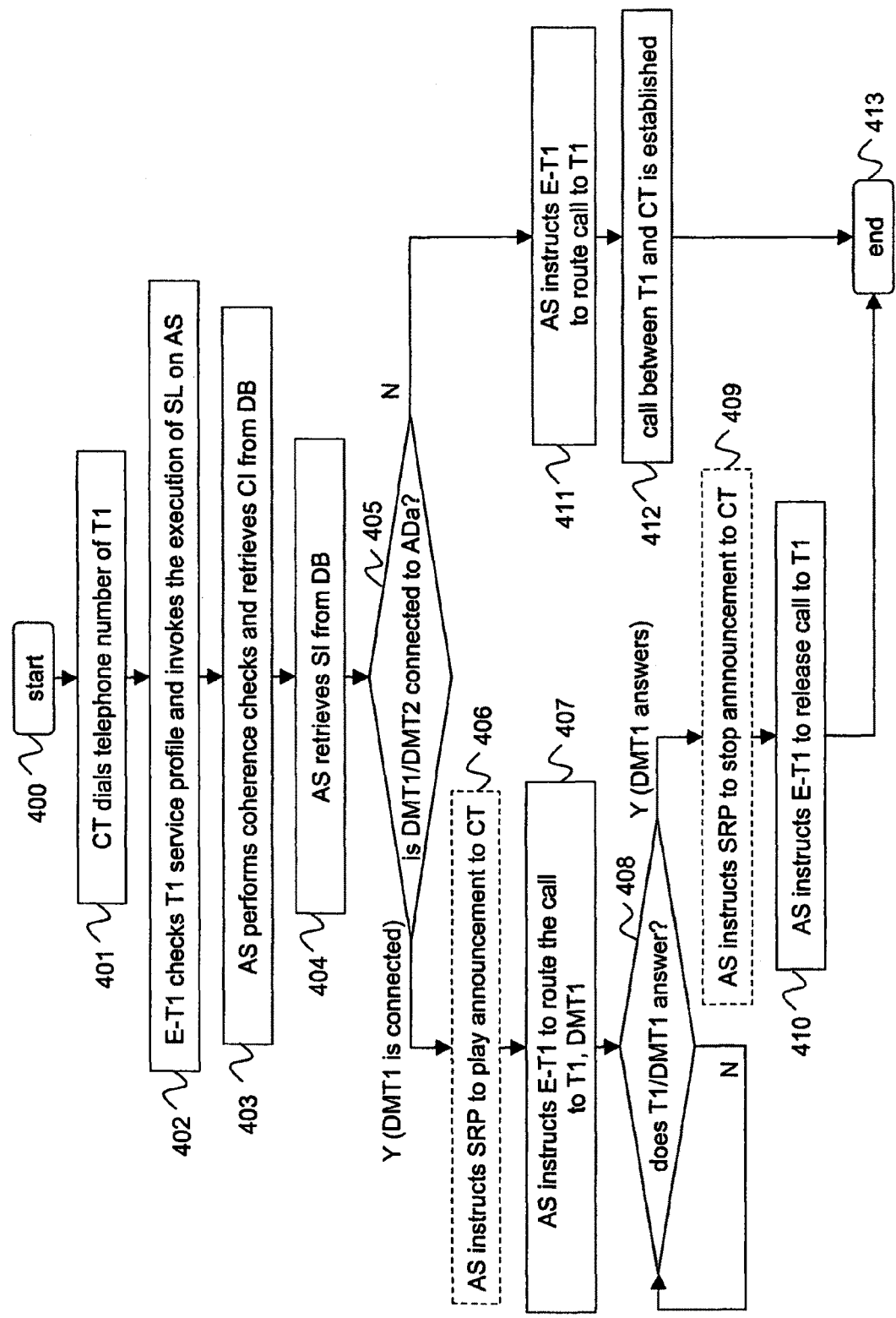
FIG. 4 shows a flow chart of the method of managing a call addressed to a fixed terminal, according to an embodiment of the present invention.

It is assumed that, following a call routing similar to that of FIG. 4, the user has answered the call through his dual mode terminal DMT2.

The call transfer procedure starts (step 700) when the user sends to the application server AS, by his dual mode terminal DMT2, a call transfer request (step 701). In view of the fact that terminal DMT2 (which terminal will be termed, in the following description "transferring terminal") is a dual mode terminal, it can send the transfer request, for instance, by a USSD string. Such string is transmitted to the application server AS through a signaling channel which is different from the voice channel, irrespective from the fact that the dual mode terminal is operating in a wireless mode or in a cellular mode. The exchange E-DMT, through UNC, receives the transfer request and forwards it to the application server AS (step 702).

Then, the application server AS recovers the configuration information CI relating to the dual mode transferring terminal DMT2 (step 703). Using the configuration information CI, the application server AS determines the access device identifier(s) to which the dual mode transferring terminal DMT2 is associated. In the considered example, the dual mode transferring terminal DMT2 is associated to the access device identifiers ADa-id and ADb-id. Moreover, the application server AS determines any dual mode and fixed terminals which are associated to each access device identifier ADa-id, ADb-id. In this example, ADa-id has associated the fixed terminal T1 and the dual mode terminal DMT1, while the ADb-id has associated the fixed terminals T2 and T3 and the dual mode terminal DMT3. In addition, during step 703, the application server AS recovers the status information SI from the data base DB. Through such status information SI, the application server verifies whether the transferring dual mode terminal DMT2 is connected to one of the access devices ADa, ADb (step 704).

In case the transferring dual mode terminal DMT2 is not connected to any of the access devices ADa, ADb, the call transfer can not be carried out. Therefore, the call between the calling terminal CT and the transferring dual mode terminal DMT2 continues without any interruption (step 710).

On the contrary, in case the transferring dual mode terminal DMT2 is connected to one of the access devices ADa, ADb (for instance ADa), it is checked whether at least one of the other dual mode terminals which are associated to ADa-id (in the present case, only dual mode terminal DMT1) is connected to ADa (step 705).

In the affirmative, the application server AS instructs the exchange E-DMT to route the call to all the other dual mode terminals which are associated to ADa-id and connected to ADa (namely DMT1) and also to all the fixed terminals which are associated to ADa-id (in this case, only terminal T1) (step 706). Then, terminals T1 and DMT1 start ringing and they continue to ring until one of them answers the call (step 707). Preferably, it is predetermined a maximum time within which the call has to be answered by one of the terminals T1, DMT1. Once the maximum time has expired, the calls to the terminals T1 and DMT1 are released (step 709). If, during step 706 the call between the calling terminal CT and the transferring terminal DMT2 was released, it will be re-established.

On the contrary, if the call is answered by the fixed terminal T1, the application server AS instructs the exchange E-DMT to release the calls towards the dual mode terminals DMT2 and DMT1 (step 708). So doing, the call between the calling terminal CT and the transferring terminal T1 is established.

If, during the step 705, the application server AS determines that, while the transferring terminal DMT2 is connected to ADa, the dual mode terminal DMT1 which is associated to ADa is not connected to ADa, the application server AS instructs the exchange E-DMT to activate a call towards the fixed terminal T1 (step 706'). Then, the fixed terminal T1 starts ringing (step 707'). Preferably, it is determined a maximum time within which the call has to be answered by the terminal T1. Once such a maximum time has lapsed, the call towards the fixed terminal T1 is released (step 709'). If during the step 706' the call between the calling terminal CT and the transferring terminal DMT2 has been released, it will be restored.

However, if the call is answered by the fixed terminal T1, the application server AS instructs the exchange E-DMT to release the call towards the transferring terminal DMT2 (step 508'). So doing, it is established a call between the calling terminal CT and the fixed terminal T1.

In the processes for transferring calls which have been described above with reference to FIGS. 6 and 7, the identifiers of the terminals with which the calls are set up for carrying out the call transfer are obtained by the application server AS which looks up configuration information and status information relating to the transferring terminal. According to other embodiments of the present invention, the terminal(s) towards which the call transfer has to be carried out can be decided by the user and can be communicated to the application server through the transferring terminal. In particular, according to an embodiment of the present invention, when the application server AS receives a request for transferring a call by a transferring terminal, it sends to the transferring terminal a message inviting the user to choose the identifier of the addressed terminal(s). Such an identifier may, for instance, correspond to E.164 number of the destination terminal, or to the short number of the destination terminal. According to another embodiment, the identifier of the user terminal may be contained in the call transfer request, both in the form of an E.164 number or in the form of short number.

Figure 8:
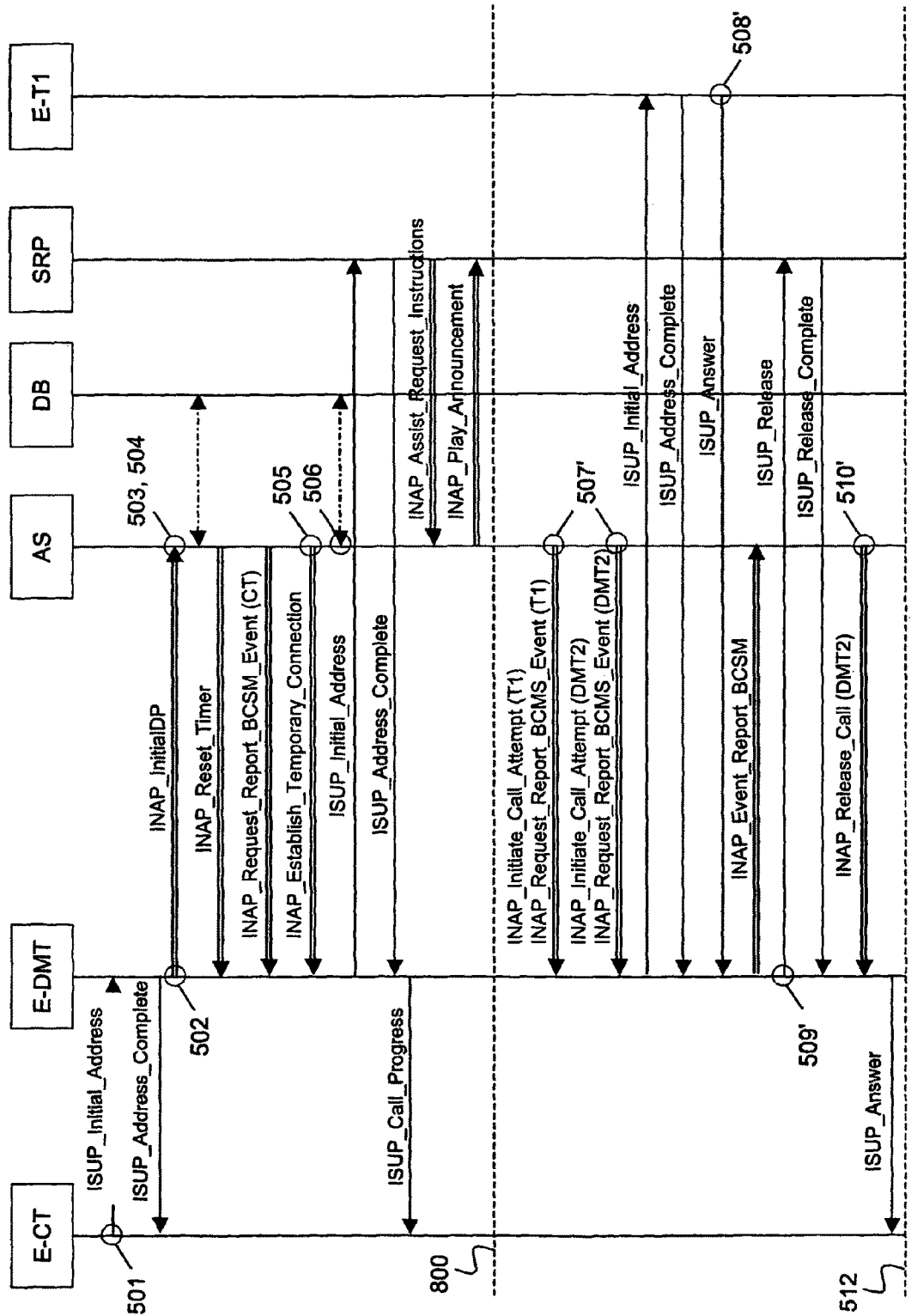
FIG. 8 schematically shows in greater detail an example of signaling messages exchanged by the apparatuses of the telephone system of FIG. 1, for implementing the method of managing a call addressed to a dual mode terminal, according to the embodiment of FIG. 5.

FIG. 8 schematically shows in greater detail an example of signaling messages exchanged by the components of the telephone system of FIG. 1, for implementing the method of managing a call addressed to a terminal (DMT2) associated to an access device according to the embodiment of the flow chart of FIG. 5. For simplicity, signaling messages between each terminal and the exchange the terminal is connected to are omitted in FIG. 8.

As already mentioned, it is supposed that the signaling in the networks PSTN and PLMN is managed through ISUP protocol, the signaling in the data network DN is managed through SIP protocol and the signaling between the application server AS and the other intelligent network devices which are arranged at the exchanges E-T1, E-DMT and SRP, takes place through INAP protocol. It is remarked that such choices are only exemplifying and not limiting.

When a caller dials, with his terminal CT, the number of dual mode terminal DMT2 (step 501), the exchange E-CT sends to the exchange E-DMT a message ISUP_Initial_Address requesting to set up a call. This message ISUP_Initial_Address comprises both the number of the terminal CT and of the dual mode terminal DMT2. The exchange E-DMT receives the message ISUP_Initial_Address from E-CT and it reads its content. The exchange E-DMT then associates the CT number read from the message ISUP_Initial_Address to the exchange E-CT, which is then recognized as the sender of such a message. Upon recognition, the exchange E-DMT replies to exchange E-CT with a message ISUP_Address_Complete, which notifies to E-CT the successful reception of the message ISUP_Initial_Address.

The exchange E-DMT then verifies the profile of DMT2 by checking whether the number of DMT2 is associated to a trigger for multiple routing of the call, and, in the affirmative, it invokes the service logics SL residing in the application server AS by sending to the application server AS a message INAP_Initial_DP (step 502). Such a INAP_Initial_DP substantially comprises the information received by E-DMT from E-CT, i.e. CT number and DMT2 number. The application server AS then performs step 503 of recovering the configuration information and status information relating to the called terminal T1, step 504 of verifying if terminal DMT2 is connected to ADa or to ADb and step 505 of verifying if at least one of the other dual mode terminals which are associated to ADa-id is connected to ADa. Assuming that, for instance, the dual mode terminal DMT1 is not connected to ADa, the application server AS sends a message INAP_Reset_Timer to the exchange E-DMT (to stop timers responsible of timing the call handling) and a message INAP_Request_Report_BCSM_Event (CT) for monitoring events relating to the originating leg of the call. The application server AS then instructs the service resource point SRP to send to the terminal CT a courtesy announcement (step 506). To this purpose, the application server AS first sends a message INAP_Establish_Temporary_Connection to E-DMT for instructing it to create a temporary connection between the exchange E-CT and the SRP.

In turn, for creating such a temporary connection between E-CT and SRP, E-DMT sends a message ISUP_Initial_Address to SRP, for informing it that the server AS is going to instruct it to play a voice announcement towards to originating leg of the call. The SRP replies with a message ISUP_Address_Complete for notifying E-DMT about the successful reception of the message ISUP_Initial_Address. The exchange E-DMT then sends a message ISUP_Call_Progress to the exchange E-CT, thus completing the creation of the temporary connection between CT and SRP via the exchanges E-CT and E-DMT.

The SRP then sends to the application server AS a message INAP_Assist_Request_Instruction for informing the application server AS that the temporary connection towards E-CT has been established, and for requesting for further instructions. In particular, through the INAP_Assist_Request_Instruction the SRP asks the application server AS which data it has to transmit through the temporary connection.

The application server AS sends to the SRP a message INAP_Play_Announcement, comprising an identifier of the voice announcement to be played to the caller while routing the call and additional information such as play mode (whether the voice announcement has to be played once or it has to be repeated more than once, how many times the voice announcement has to be repeated, or the like). Then, the caller receives, through his terminal CT the courtesy announcement inviting him, for instance, to hold the line while the call is routed (step 800, as shown in FIG. 8).

The application server AS further instructs the exchange E-DMT to route the call coming from E-CT and originally addressed to DMT2 both to DMT2 and to T1 (step 507'). For this purpose, the application server sends to the exchange E-DMT a message INAP_Initiate_Call_Attempt (T1) containing the number of T1 and a request for opening a new leg towards T1 and a message INAP_Initiate_Call Attempt (DMT2) containing the number of DMT2 and a request for opening a new leg towards DMT2. Then, the application server AS asks sends to E-DMT a message INAP_Request_Report_BSCM_Event (T1) comprising a request for monitoring the new leg to be created towards T1, and a message INAP_Request_Report BSCM_Event (DMT2) comprising a request for monitoring the new leg to be created towards DMT2. Monitoring the new legs in particular comprises monitoring particular events, such as alerting events, busy events, failed routing events and so on.

Then, the exchange E-DMT associates the number of T1 comprised into the message INAP_Initiate_Call_Attempt (T1) to the exchange E-T1, which is then recognized as the addressee of a further message ISUP_Initial_Address comprising the number of T1. The exchange further identifies the number of DMT2 comprised into the message INAP_Initiate_ Call_Attempt (DMT2) as a number of one of the terminals connected to it. In other words, the leg towards DMT2 and requested by the application server INAP_Initiate_Call_Attempt (DMT2) simply requires exchanging signaling messages (not shown in FIG. 8) between E-DMT and DMT2.

Upon reception of the message ISUP_Initial_Address from E-DMT, E-T1 sends it a message ISUP_Address_Complete, which notifies to E-DMT the successful reception of the message ISUP_Initial_Address. The terminal T1 starts ringing and will continue to ring until the user answer the call from his dual mode terminal DMT2 (which is the originally called terminal) or from his fixed terminal T1 (step 508').

When the user answers the call (for instance by using his terminal T1), the exchange E-T1 sends a message ISUP_Answer to the exchange E-DMT. The exchange E-DMT, upon reception of the message ISUP_Answer, stores it for further forwarding to the exchange E-CT.

The exchange E-DMT then informs the application server AS about the fact that T1 answered the call through a message INAP_Event_Report_BCSM. The exchange E-DMT then releases the call towards the SRP by sending to the SRP a message ISUP-release, thus interrupting the sending of the courtesy message (step 509'). The SRP replies to this message by a message ISUP_Release_Complete. The application server AS then instructs the exchange E-DMT to release the call towards DMT2, by a message INAP_Release_Call (DMT2). Finally, the exchange E-DMT forwards the stored message ISUP_Answer to the exchange E-CT, so that a call between terminal CT and terminal T1 is set up.

It has to be noticed that, in the above description, it has been assumed that only fixed terminals and dual mode terminals can be associated to an access device identifier. Nevertheless, in other embodiments of the present invention which have not been detailed into the present description, also mobile terminals of a mobile telephone network may be associated to an access device identifier. According to such embodiments, calls originally addressed to a mobile terminal associated to an access device identifier are also routed to other terminals associated to the same access device identifier, if the mobile terminal is located within a predetermined cell, for instance a cell comprising the coverage area of the access device the mobile terminal is associated to. If the other associated terminals comprise further mobile terminals, the call is routed also to such further associated mobile terminals only after checking whether they are also located into the cell of the originally called mobile terminal. Similarly, calls originally addressed to a fixed or dual mode terminal associated to an access device identifier can also be routed to mobile terminal(s) associated to the same access device identifier. In particular, the call is routed also to such mobile terminal(s) only after checking whether such terminal(s) and the associated access device are located into the same cell of the mobile network.

The invention claimed is:

1. A method of managing a call addressed to a first terminal operating in a telephone system, the telephone system comprising a mobile network, a packet-switched network and an access device allowing connection of dual mode terminals to said packet-switched network, comprising:
   a) providing configuration information by associating information related to a set of terminals with an identifier of the access device, said set of terminals being physically separated devices and comprising a dual mode terminal operating in said mobile network or in said packet-switched network;
   b) providing status information related to the dual mode terminal; and
   c) upon reception of a request for said call, checking whether the first terminal belongs to said set of terminals;
   d) in the affirmative, routing the call to at least one selected terminal of the set of terminals, the selection being performed based on said configuration information and said status information; and
   e) in the negative, routing the call to the first terminal.

2. The method according to claim 1, wherein the first terminal is said dual mode terminal of the set of terminals, and wherein said step d) comprises:
   d1) checking whether the first terminal is connected to the packet-switched network through the access device; and
   d2) in the negative, routing the call to the first terminal.

3. The method according to claim 1, wherein the first terminal is said dual mode terminal of the set of terminals, and wherein step d) comprises:
- d1) checking whether the first terminal is connected to the packet-switched network through the access device;
- d2) in the affirmative,
  - d31) checking whether said set of terminals comprises a further dual mode terminal;
  - d32) in the affirmative, checking whether the further dual mode terminal is connected to the packet-switched network through the access device;
    - d321) in the affirmative, routing the call to the first terminal and to the further dual mode terminal; and
    - d322) in the negative, routing the call to the first terminal and not to the further dual mode terminal.

4. The method according to claim 1, wherein the first terminal is said dual mode terminal of the set of terminals, and wherein step d) comprises:
- d1) checking whether the first terminal is connected to the packet-switched network through the access device;
- d4) in the affirmative, checking whether said set of terminals comprises at least one fixed terminal; and
- d5) in the affirmative, routing the call to the first terminal and to the at least one fixed terminal.

5. The method according to claim 1, wherein the first terminal comprises a fixed terminal, and wherein step d) comprises:
- d1) checking whether said dual mode terminal of the set of terminals is connected to the packet-switched network through the access device; and
- d2) in the negative, routing the call to the first terminal and not to the dual mode terminal of the set of terminals.

6. The method according to claim 1, wherein the first terminal comprises a fixed terminal, and wherein step d) comprises:
- d1) checking whether said dual mode terminal of the set of terminals is connected to the packet-switched network through the access device; and
- d3) in the affirmative, routing the call to the first terminal and to the dual mode terminal of the set of terminals.

7. The method according to claim 1, wherein, when the call is answered by a terminal, any further call routed to other terminals is released.

8. A telephone network subsystem for managing a call addressed to a first terminal operating in a telephone system, the telephone system comprising a mobile network, a packet-switched network and an access device allowing connection of dual mode terminals to said packet-switched network, comprising:
- a database for storing configuration information and status information, wherein the configuration information is obtained by associating information related to a set of terminals with an identifier of the access device, said set of terminals being physically separated devices and comprising a dual mode terminal operating in said mobile network or in said packet-switched network, and wherein said status information relates to the dual mode terminal; and
- a server having a service logic which, upon reception of a request for said call, checks whether the first terminal belongs to said set of terminals; and
  - in the affirmative, the service logic commanding routing of the call to at least one selected terminal of the set of terminals, the selection being performed based on said configuration information and said status information; or
  - in the negative, the service logic commanding routing of the call to the first terminal.

9. The telephone network subsystem according to claim 8, wherein the first terminal is said dual mode terminal of the set of terminals, said service logic checking whether the first terminal is connected to the packet-switched network through the access device, and, if the check is negative, the service logic commanding routing of the call to the first terminal.

10. The telephone network subsystem according to claim 8, wherein the first terminal is said dual mode terminal of the set of terminals, and wherein said service logic comprises:
- d1) an adaptation for checking whether the first terminal is connected to the packet-switched network through the access device;
- d3) in the affirmative,
  - d31) the service logic checking whether said set of terminals comprises a further dual mode terminal;
  - d32) in the affirmative, the service logic checking whether the further dual mode terminal is connected to the packet-switched network through the access device;
    - d321) in the affirmative, the service logic commanding routing of the call to the first terminal and to the further dual mode terminal; and
    - d322) in the negative, the service logic commanding routing of the call to the first terminal and not to further dual mode terminal.

11. The telephone network subsystem according to claim 8, wherein the first terminal is said dual mode terminal of the set of terminals, and wherein said service logic comprises:
- d1) an adaptation for checking whether the first terminal is connected to the packet-switched network through the access device;
- d4) in the affirmative, the service logic checking whether said set of terminals comprises at least one fixed terminal; and
- d5) in the affirmative, the service logic commanding routing the call to the first terminal and to the at least one fixed terminal.

12. The telephone network subsystem according to claim 8, wherein the first terminal comprises a fixed terminal, and wherein said service logic comprises:
- d1) an adaptation for checking whether the dual mode terminal of the set of terminals is connected to the packet-switched network through the access device; and
- d2) in the negative, the service logic commanding routing the call to the first terminal and not to the dual mode terminal of the set of terminals.

13. The telephone network subsystem according to claim 8, wherein the first terminal comprises a fixed terminal, and wherein said service logic comprises:
- d1) an adaptation for checking whether the dual mode terminal of the set of terminals is connected to the packet-switched network through the access device; and
- d3) in the affirmative, the service logic commanding routing the call to the first terminal and to the dual mode terminal of the set of terminals.

14. The telephone network subsystem according to claim 8, wherein, when the call is answered by a terminal, any further calls routed to other terminals are released.

15. A non-transitory computer readable storage medium encoded with a computer program product, the computer program product being loadable in a memory of at least one computer and comprising software code portions for performing a method of managing a call addressed to a first terminal operating in a telephone system, the telephone system comprising a mobile network, a packet-switched network and an access device allowing connection of dual mode terminals to said packet-switched network, the method comprising:
- a) providing configuration information by associating information related to a set of terminals with an identifier of the access device, said set of terminals being physically separated devices and comprising a dual mode terminal operating in said mobile network or in said packet-switched network;
- b) providing status information related to the dual mode terminal; and
- c) upon reception of a request for said call, checking whether the first terminal belongs to said set of terminals;
- d) in the affirmative, routing the call to at least one selected terminal of the set of terminals, the selection being performed based on said configuration information and said status information; and
- e) in the negative, routing the call to the first terminal.

16. A method of managing a call addressed to a first terminal operating in a telephone system, the telephone system comprising a mobile network, a packet-switched network and an access device allowing connection of dual mode terminals to said packet-switched network, comprising:
- a) providing configuration information by associating information related to a set of terminals with an identifier of the access device, said set of terminals comprising a dual mode terminal operating in said mobile network or in said packet-switched network;
- b) providing status information related to the dual mode terminal; and
- c) upon reception of a request for said call, checking whether the first terminal belongs to said set of terminals;
- d) in the affirmative, routing the call to at least one selected terminal of the set of terminals, the selection being performed based on said configuration information and said status information, comprising:
  - d1) checking whether the first terminal is connected to the packet-switched network through the access device;
  - d2) in the affirmative,
    - d31) checking whether said set of terminals comprises a further dual mode terminal;
    - d32) in the affirmative, checking whether the further dual mode terminal is connected to the packet-switched network through the access device;
      - d321) in the affirmative, routing the call to the first terminal and to the further dual mode terminal; and
      - d322) in the negative, routing the call to the first terminal and not to the further dual mode terminal; and
- e) in the negative, routing the call to the first terminal.

17. A telephone network subsystem for managing a call addressed to a first terminal operating in a telephone system, the telephone system comprising a mobile network, a packet-switched network and an access device allowing connection of dual mode terminals to said packet-switched network, comprising:
- a database for storing configuration information and status information, wherein the configuration information is obtained by associating information related to a set of terminals with an identifier of the access device, said set of terminals comprising a dual mode terminal operating in said mobile network or in said packet-switched network, and wherein said status information relates to the dual mode terminal; and
- a server having a service logic which, upon reception of a request for said call, checks whether the first terminal belongs to said set of terminals; and
  - in the affirmative, the service logic commanding routing of the call to at least one selected terminal of the set of terminals, the selection being performed based on said configuration information and said status information, wherein the service logic comprises:
    - d1) an adaptation for checking whether the first terminal is connected to the packet-switched network through the access device;
    - d3) in the affirmative,
      - d31) the service logic checking whether said set of terminals comprises a further dual mode terminal;
      - d32) in the affirmative, the service logic checking whether the further dual mode terminal is connected to the packet-switched network through the access device;
        - d321) in the affirmative, the service logic commanding routing of the call to the first terminal and to the further dual mode terminal; and
        - d322) in the negative, the service logic commanding routing of the call to the first terminal and not to further dual mode terminal; or
  - in the negative, the service logic commanding routing of the call to the first terminal.

18. A method of managing a call addressed to a first terminal operating in a telephone system, the telephone system comprising a mobile network, a packet-switched network, and an access device allowing connection of dual mode terminals to said packet-switched network, the method comprising:
- a) providing configuration information relating to said first terminal, said configuration information comprising an identifier of said access device and associated information related to a set of terminals, said set of terminals comprising a dual mode terminal, which is adapted to operate in said mobile network and in said packet-switched network;
- b) providing status information related to the dual mode terminal;
- c) upon reception of a request for said call, retrieving said configuration information and said status information; and
- d) routing the call to at least one selected terminal of the set of terminals, the selection being performed based on said configuration information and said status information.

19. A telephone network subsystem for managing a call addressed to a first terminal operating in a telephone system, the telephone system comprising a mobile network, a packet-switched network and an access device allowing connection of dual mode terminals to said packet-switched network, wherein said subsystem comprises:
- a database for storing configuration information and status information, wherein such configuration information comprise an identifier of the access device and associated information related to a set of terminals, said set of terminals comprising a dual mode terminal, which is adapted to operate in said mobile network and in said packet-switched, and wherein said status information relates to the dual mode terminal; and a server having a service logic which is adapted for, upon reception of a request for said call, retrieving said configuration information and said status information; and commanding routing of the call to at least one selected terminal of the set of terminals, the selection being performed based on said configuration information and said status information.

* * * * *